(12) United States Patent
Nepa et al.

(10) Patent No.: US 9,615,514 B2
(45) Date of Patent: Apr. 11, 2017

(54) HEADSTONE EDGING BORDER DEVICE

(71) Applicants: Felix Nepa, Archbald, PA (US); Jeffrey Nepa, Jermyn, PA (US); Paul Nepa, North Las Vegas, NV (US)

(72) Inventors: Felix Nepa, Archbald, PA (US); Jeffrey Nepa, Jermyn, PA (US); Paul Nepa, North Las Vegas, NV (US)

(73) Assignee: Nepa Innovations, Carbondale, PA (US)

( * ) Notice: Subject to any disclaimer, the term of this patent is extended or adjusted under 35 U.S.C. 154(b) by 0 days.

(21) Appl. No.: 14/316,055

(22) Filed: Jun. 26, 2014

(65) Prior Publication Data

US 2015/0007507 A1    Jan. 8, 2015

Related U.S. Application Data

(63) Continuation of application No. 13/762,178, filed on Feb. 7, 2013, now abandoned.

(60) Provisional application No. 61/633,322, filed on Feb. 8, 2012.

(51) Int. Cl.
*A01G 1/08* (2006.01)
*E04H 13/00* (2006.01)

(52) U.S. Cl.
CPC ............ *A01G 1/08* (2013.01); *E04H 13/001* (2013.01); *E04H 13/003* (2013.01)

(58) Field of Classification Search
CPC ............ A01G 13/0281; A01G 13/0268; A01G 13/0256; A01G 13/043; A01G 1/08; E04H 13/001; E04H 13/003
USPC ....... 47/15, 33, 41.1, 31.1, 41.01, 41.14, 31; 52/103, 102, 155
See application file for complete search history.

(56) References Cited

U.S. PATENT DOCUMENTS

| | | | |
|---|---|---|---|
| 342,690 A * | 5/1886 | Flatau | 47/33 |
| 1,963,804 A * | 6/1934 | Powell | 47/41.1 |
| 2,095,290 A * | 10/1937 | Roy | 52/38 |
| 3,305,969 A * | 2/1967 | Mattson | 47/32 |
| 3,477,181 A * | 11/1969 | Robison | 52/27 |
| 3,604,172 A * | 9/1971 | Matvey | 52/103 |
| 3,619,944 A * | 11/1971 | Matvey | 47/33 |
| 3,704,004 A * | 11/1972 | Carter, Jr. | 256/1 |
| 3,758,999 A * | 9/1973 | Matvey | 52/103 |
| 3,955,319 A * | 5/1976 | Smith | 47/9 |

(Continued)

*Primary Examiner* — James Ference
(74) *Attorney, Agent, or Firm* — Law Offices of John A. Parrish

(57) ABSTRACT

An edging border device for controlling growth of vegetation is disclosed. The device includes a material sheet that has one or more openings suitable for enabling the material sheet to contact a portion of an object present in the opening. The material sheet includes one or more extending portions that extend away from the opening. The extending sheet may have a decorative surface to compliment the appearance of the object present in an opening. An extending portion may be formed of anyone or more of permeable materials, impermeable materials or combinations thereof. An extending portion may include one or more agricultural control agents wherein the control agents include one or more of herbicidal agents, fungicidal agents, insecticidal agents and mixtures thereof. Permeable materials may include cellulosic materials such as wood and wood composites. Impermeable materials may be anyone or more of rubber, plastic, metal and mixtures thereof.

13 Claims, 3 Drawing Sheets

(56) References Cited

U.S. PATENT DOCUMENTS

| | | | |
|---|---|---|---|
| 4,317,309 A * | 3/1982 | Sheldon | 47/32 |
| 4,321,769 A * | 3/1982 | Tisbo et al. | 47/33 |
| D293,957 S * | 1/1988 | Miller | D99/17 |
| 5,139,566 A * | 8/1992 | Zimmerman | 504/361 |
| 5,178,495 A * | 1/1993 | Cameron | 405/303 |
| 5,181,952 A * | 1/1993 | Burton et al. | 504/347 |
| 5,323,557 A * | 6/1994 | Sonntag | 47/32 |
| 5,396,731 A * | 3/1995 | Byrne | 47/32 |
| 5,428,935 A * | 7/1995 | Mitchell | 52/698 |
| 5,437,127 A * | 8/1995 | Ha | 52/103 |
| 5,509,231 A * | 4/1996 | Marcoux | 47/58.1 R |
| 5,517,790 A * | 5/1996 | Jennings | 52/103 |
| 5,519,966 A * | 5/1996 | Cassette | 47/41.01 |
| 5,564,816 A * | 10/1996 | Arcadia et al. | 362/183 |
| 5,589,240 A * | 12/1996 | Hunter | 428/34.1 |
| 5,644,998 A * | 7/1997 | Krolick | 111/102 |
| 5,647,951 A * | 7/1997 | Bayer | 156/62.2 |
| 5,729,929 A * | 3/1998 | Burke | 47/9 |
| 5,845,436 A * | 12/1998 | Nota | 52/103 |
| 5,855,090 A * | 1/1999 | Reum, Sr. | 47/9 |
| 5,942,029 A * | 8/1999 | Spittle | 106/164.3 |
| 6,088,955 A * | 7/2000 | Nelson et al. | 47/41.1 |
| 6,230,439 B1 * | 5/2001 | Solis | 47/58.1 R |
| 6,349,500 B1 * | 2/2002 | Popham | 47/32 |
| 6,363,635 B1 * | 4/2002 | England | 40/124.5 |
| 6,446,400 B1 * | 9/2002 | Block et al. | 52/102 |
| 6,526,693 B2 * | 3/2003 | Cochran | 47/66.5 |
| 6,564,506 B1 * | 5/2003 | Leger | 47/41.01 |
| 6,949,010 B2 * | 9/2005 | Light et al. | 451/28 |
| 7,001,111 B2 * | 2/2006 | Maxwell et al. | 405/302.6 |
| 7,013,597 B1 * | 3/2006 | Dominguez | 47/32 |
| 7,144,201 B2 * | 12/2006 | DeArmond, Jr. | 405/286 |
| 7,175,507 B2 * | 2/2007 | Light | G09F 19/22 451/28 |
| 7,452,445 B2 * | 11/2008 | Huang et al. | 162/72 |
| 7,484,330 B2 * | 2/2009 | Lougheed | 47/9 |
| 7,617,631 B2 * | 11/2009 | Conrad et al. | 47/31.1 |
| 7,685,764 B2 * | 3/2010 | Moore | 47/9 |
| 7,799,424 B2 * | 9/2010 | Mochiduki et al. | 428/357 |
| 7,966,765 B2 * | 6/2011 | Lougheed | A01G 13/0262 47/9 |
| 8,075,977 B2 * | 12/2011 | Curro et al. | 428/92 |
| 8,215,056 B2 * | 7/2012 | Frederick | A01G 13/0268 47/31.1 |
| 2002/0038785 A1 * | 4/2002 | Hosoya | 210/630 |
| 2002/0124463 A1 * | 9/2002 | Venable | 47/9 |
| 2002/0144383 A1 * | 10/2002 | Spence | 27/35 |
| 2003/0211284 A1 * | 11/2003 | Karul | 428/137 |
| 2004/0055228 A1 * | 3/2004 | Santa Cruz et al. | 52/102 |
| 2004/0154729 A1 * | 8/2004 | LeBoeuf et al. | 156/155 |
| 2004/0157041 A1 * | 8/2004 | LeBoeuf et al. | 428/137 |
| 2004/0157051 A1 * | 8/2004 | Trent et al. | 428/327 |
| 2004/0168389 A1 * | 9/2004 | Marsh et al. | 52/479 |
| 2004/0241390 A1 * | 12/2004 | LeBoeuf et al. | 428/137 |
| 2006/0000767 A1 * | 1/2006 | Trauger et al. | 210/503 |
| 2006/0021266 A1 * | 2/2006 | Helwig | 40/124.5 |
| 2006/0286888 A1 * | 12/2006 | Olsta et al. | 442/417 |
| 2007/0253785 A1 * | 11/2007 | Tyler | 405/302.6 |
| 2008/0016759 A1 * | 1/2008 | Tyler | E02D 17/202 47/31 |
| 2008/0312086 A1 * | 12/2008 | Barazani | 504/347 |
| 2009/0158646 A1 * | 6/2009 | Moore et al. | 47/9 |
| 2010/0263273 A1 * | 10/2010 | Wessel et al. | 47/41.1 |
| 2011/0036010 A1 * | 2/2011 | Silverberg | 47/62 R |
| 2011/0232174 A1 * | 9/2011 | Mills | 47/20.1 |
| 2011/0258922 A1 * | 10/2011 | Frederick | 47/32.3 |

* cited by examiner

US 9,615,514 B2

HEADSTONE EDGING BORDER DEVICE

TECHNICAL FIELD

The disclosure relates to devices for controlling growth of ground cover plants surrounding the periphery of objects such as headstones.

BACKGROUND

Markers used at a gravesite are typically made from relatively permanent materials. Such markers may be made from durable natural materials such as granite or marble and sometimes they are made from manufactured materials such as concrete, bronze, or steel. These markers come in varied shapes and sizes. While markers do exist in ornate forms such as angelic statues or in some effigy of the deceased, etc., many markers are of a conventional tablet design, i.e., a flat surface with etched lettering. This conventional tablet is oriented either horizontally or vertically. Such tablet is commonly referred to as a headstone, gravestone, grave-marker, memorial-stone, memorial-marker, or the like.

Grave-markers are typically set into the earth by excavating a hole in the ground that generally conforms to the rectangular block shape of the grave-marker. This is accomplished in much the same manner as a conventional pave-stone is set in place to form a walking path. The grave-marker is usually placed in direct contact with the soil. Variations in marker sites, and the difficulty in efficiently excavating the hole to ensure a tight fit of the marker therein, can accelerate damage to the marker. At a number of gravesites, markers that are flush to the ground are commonplace. Their use is on the rise and when limited resources conflict with a strong interest in maintaining the dignity of such facility, it is important that the memorialization process be efficient without compromising the quality of the site. Unfortunately, vegetation growth surrounding a grave-marker can overgrow the marker and obscure its location. Prevention requires constant, periodic maintenance to remove unwanted vegetation growth.

Although conventional methods such as use of cutting devices such as string trimmers have been used to control grown, this is labor intensive and costly. A need therefore exists for methods and devices for control of vegetation growth.

SUMMARY

An edging border device for controlling growth of vegetation adjacent an object such as a grave marker is disclosed. The device includes a material sheet that has one or more object openings suitable for enabling the material sheet to contact at least a portion of an object present in the opening. The material sheet includes one or more extending portions that extend away from an object opening whereby the material sheet enables control of growth of vegetation adjacent the object and beneath the device. The extending sheet may have a decorative surface finish to compliment the appearance of the object present in an object opening. The extending portions may have any one or more of polygonal shapes, circular shapes, conical shapes or combinations thereof. The extending portions may have a variable thickness and may have a variable stiffness wherein the stiffness near the opening is less than the stiffness distal to the opening. An extending portion may be formed of any one or more of permeable materials, impermeable materials or combinations thereof. An extending portion may include one or more agricultural control agents wherein the control agents include one or more of herbicidal agents, fungicidal agents, insecticidal agents and mixtures thereof. Permeable materials may include cellulosic materials such as wood and wood composites. Impermeable materials may be any one or more of rubber, plastic, metal and mixtures thereof.

The border device advantageously enables control of vegetation in an area surrounding an object such as a grave marker.

DETAILED DESCRIPTION

Figure 1:
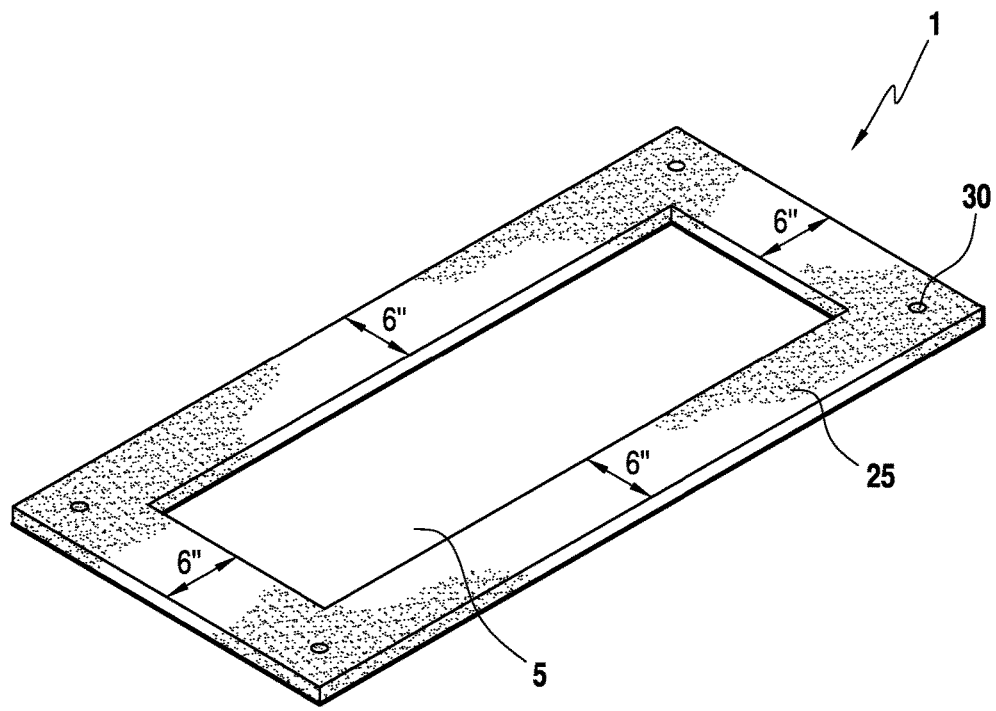
FIG. 1 shows a first embodiment of a border device in the form of a rectangle includes an object opening.
Figure 1A:
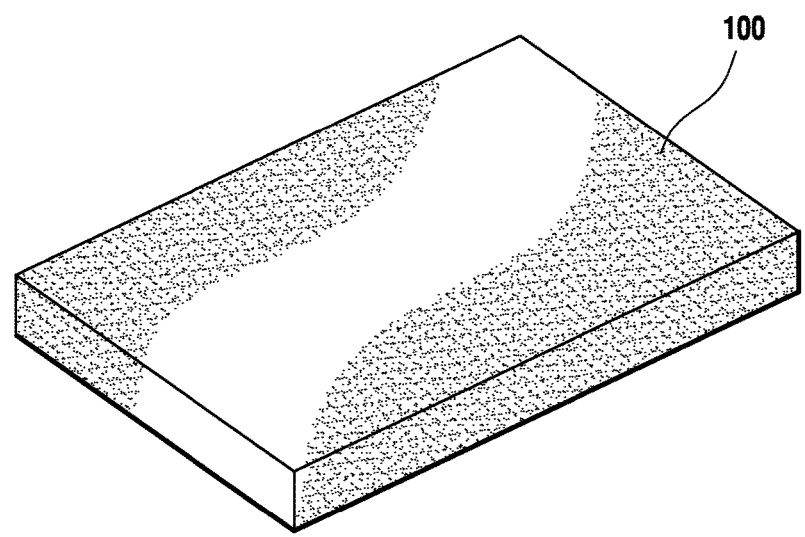
FIG. 1A shows a grave marker that by be fitted into an object opening in the border device shown in FIG. 1.

Referring to FIG. 1, border device 1 is shown as having an object opening configured to surround the periphery of an object 100 such as a grave marker headstone as shown in FIG. 1A. Although object 100 is shown in the form of a rectangle, it is to be understood that object 100 may have any desired configuration.

Figure 3:
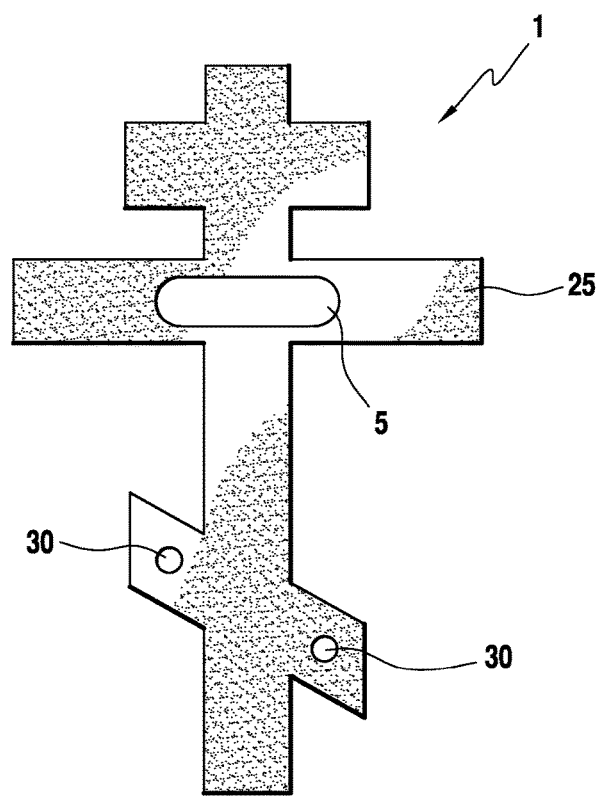
FIG. 3 is a top view of a border device configured in the form of an orthodox cross.

Border device 1 includes one or more extending portions 25 that extend from opening 5. Border device 1 may be configured as any desired form having any of circular, conical and polygonal shapes, and combinations thereof. Conical shapes may include but are not limited to ellipsoidal, hemispheric and parabolic and combinations thereof. Other shapes in border device 1 may be configured include but are not limited to circles, ovals, crosses such as orthodox crosses as shown in FIG. 3, stars, clovers and combinations thereof.

Figure 1B:
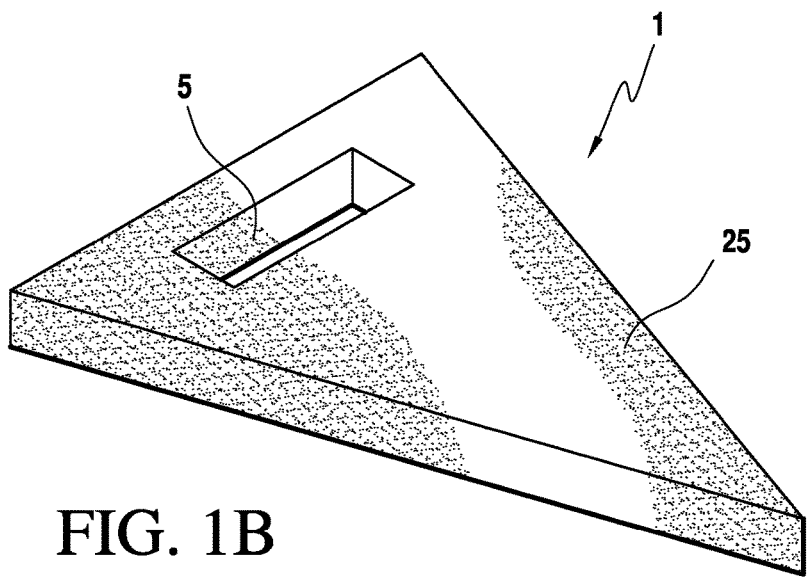
FIG. 1B shows a border device 1 in the form of a regular polygon having three sides and an object opening.
Figure 1C:
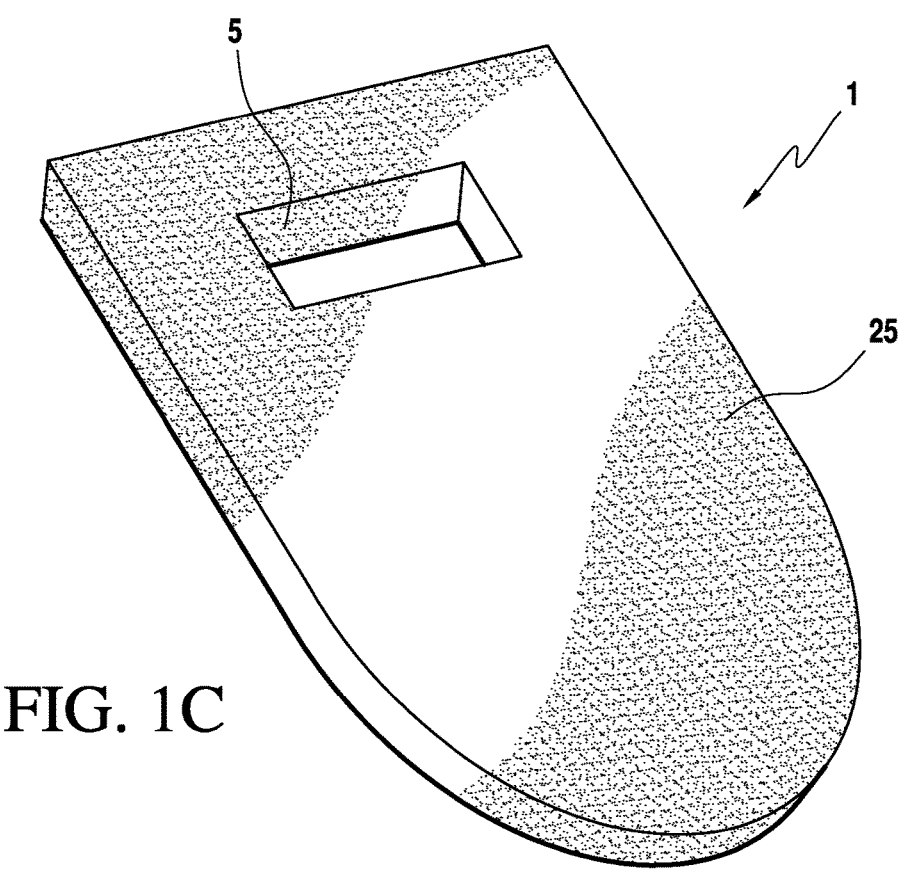
FIG. 1C shows a border device 1 configured to include a conical shape such as parabolic.

Polygonal shapes may have N sides where N may be any number, such as 3 to 30, such as 3 so as to have a shape in the form of any one or more of squares, octagons, pentagons, rectangles, triangles, hexagons, and heptagons, and triangles such as shown in FIG. 1B. Polygonal shapes may be regular and irregular where one or more sides of the polygon differ in size. An example of regular polygon having four sides is a square and an example of irregular polygon have four sides is a rectangle.

An extending portion 25 may extend uniformly or randomly in all directions from opening 5. An extending portion 25 may include one or more receiving holes 30 therein to receive fasteners such as nails, screws and the like (nor shown) to secure border device 1 at a desired position. Holes 30 also may be used to receive decorative artificial or natural plantings.

Figure 2:
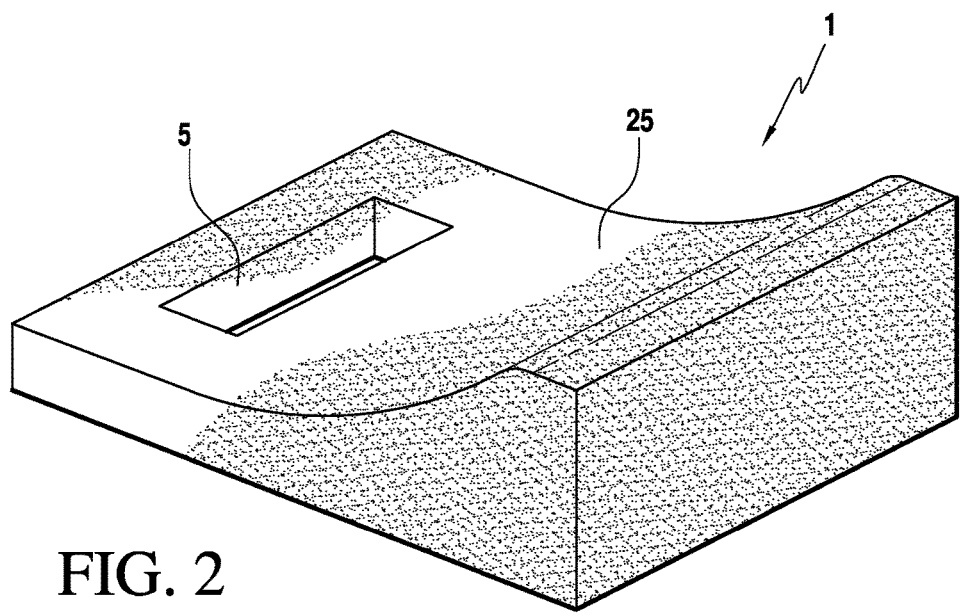
FIG. 2 shows a border device where the extending sections extend both laterally and upwardly and which has a variable thickness.

An extending portion 25 may extend at any desired angle to the horizontal from opening 5. For example, an extending portion 25 may extend laterally and/or upwardly from opening 5 and may have a variable thickness as shown in FIG. 2. Typically, extending portion 25 may have a thickness of about 0.5 inches to about 0.75 inches. Extending portions 25 also may have a variable stiffness throughout any selected section of extending portion 25. Stiffness near opening 110 may be less than the stiffness distal to the opening within a given section of extending portion 25. Variable stiffness may be achieved by varying the composition within one or more selected sections of an extending portion 25, by varying the extent of compaction within a selected section, or combinations thereof. Compositions that have higher amounts of high modulus materials such as glass, metal and the like may be used to provide higher stiffness and use of higher pressures to compact the compositions may be used to achieve higher stiffness.

Object opening 5 may have any desired configuration according to the periphery of the object to be contacted by border device 1.

Border device 1 may be made from a wide variety of impermeable materials, permeable materials and combinations thereof. The border device may include on the bottom surface thereof one or more layers of weed fabric. Weed fabrics such as Sunbelt Weed Fabric from Grow Organic may be employed.

The materials employed in manufacture of border device 1 may be blended with agricultural control agents such as but not limited to herbicidal agents, fungicidal agents, insecticidal agents and mixtures thereof. Examples of herbicidal agents that may be employed include but are not limited to pre-emergent herbicides such as corn gluten meal, glyphosate-containing herbicides such as Aquaneat and dichlobenil containing herbicides such as Casoron 4G from Synatek. Other herbicides that may be employed include but are not limited to Eject 75WDG and Escalade 2 available from Synatek. Examples of fungicidal agents that may be employed include but are not limited to sulphur, garlic, mixtures of copper sulfate and lime, as well as any commercially available fungicide. Examples of insecticidal agents that may be employed include but are not limited to calcium arsenate, copper acetoarsenate, copper arsenate, potassium arsenate, sodium arsenate and mixtures thereof. Also, any commercially available insecticide may be used.

The agricultural control agents may be present in the material compositions used in manufacture of the border member in a wide range of amounts. Typically, these amounts are about 0.1% to about 20% by weight based on the weight of the material used in manufacture of the border device. Permeable materials that may be employed include but are not limited to cellulosic materials, sand and mixtures thereof. Impermeable materials that may be employed include but are not limited to rubber, plastics, metals and mixtures thereof. Where the materials are permeable, pore sizes sufficient to enable penetration of fluids such as herbicidal agents into a desired depth in the border member. Pore sizes may vary from about 0.1 micron to about 100 micron.

The presence of herbicidal agents within the interior of the border device may provide an additional level of protection against unwanted plant growth around or over the border device while enabling desirable plantings such as flowering plants to grow though the border device. In this way, the border device may simultaneously prevent unwanted weed growth while permitting desirable flowering plants to grow there through. Similarly, fungicidal and insecticidal agents present within permeable materials employed in manufacture of border device 1 may prevent growth of undesirable fungal growth as well as undesirable insect infestations.

The materials used in border device 1 also may include antioxidants and light stabilizers. Antioxidants and light stabilizers that may be employed include, but are not limited to, 4,4-diarylbutadienes, cinnamic esters, benzotriazoles, hydroxybenzophenones, diphenylcyanoacrylates, oxamides (oxalamides), 2-phenyl-1,3,5-triazines; sterically hindered amines, phosphites and phosphonites, hydroxylamines, nitrones, amine oxides, benzofuranones and indolinones, thiosynergists, peroxide scavengers, and basic costabilizers.

Materials used in border device 1 may be scored on at least one surface thereof to facilitate cutting and trimming of the device along the score lines. The score lines may be in any desired configuration and in any desired location.

Border devices as described herein may be made by compression molding of any of permeable materials, impermeable materials and mixtures thereof, with or without agricultural control chemicals. The materials may be compressed under pressures sufficient to produce a border device having a desired porosity. Typically, these pressures are about 500 PSI to about 5000 PSI. Typically, the border device has a porosity of less than about 5% such as where the border device is be employed to minimize or prevent growth of plant life through the thickness of the border device. Where the border device is intended to permit selected plant growth through the thickness of the border device, the porosity of the border device may be up to about 10%.

Border device 1 may be employed with a wide variety of objects such as headstones that have a wide variety of shapes and sizes. In use, border device 1, such as in the configuration of a triangle as shown in FIG. 1B, is placed over an object such as a object 100 that has a shape corresponding to that of object opening 5 so that the edges of object opening 5 abut the surfaces of object 100 and closely conforms to the ground surfaces surrounding object 100. Border device 1 thereby may control vegetation from growing around or over object 100.

The invention claimed is:

1. An edging border device for controlling growth of vegetation adjacent an object, the device comprising a single sheet material having an opening configured to receive the object within the opening and, wherein the single sheet material has an extending portion that extends a distance away from the opening, and wherein the single sheet material is a homogenous blend of
    a) permeable material and/or impermeable material and
    b) an agricultural control agent and
    c) any of antioxidants and light stabilizers wherein the antioxidants and light stabilizers are selected from the group consisting of 4,4-diarylbutadienes, cinnamic esters and amine oxides and
wherein the agricultural control agent is an herbicidal agent, fungicidal agent, insecticidal agent and/or mixtures thereof.

2. The device of claim 1 wherein the object is a grave marker and the blend comprises a permeable material and agricultural control agent wherein the agricultural control agent is a mixture of herbicidal agent and fungicidal agent.

3. The device of claim 2 wherein the mixture further comprises insecticidal agent.

4. The device of claim 1 wherein the extending portion has a thickness that increases with the distance from the opening.

5. The device of claim 1 wherein the extending portion has a stiffness that increases with the distance from the opening.

6. The device of claim 5 wherein the single sheet material has one or more holes for receiving a fastener therein.

7. The device of claim 6 further comprising a weed fabric in contact with the single sheet material.

8. The device of claim 1 wherein the agricultural control agent is a pre-emergent herbicide.

9. The device of claim 1 wherein the permeable material comprises cellulosic material.

10. The device of claim 1 wherein the impermeable material is selected from the group consisting of rubber, plastic, metal and mixtures thereof.

11. The device of claim 1 wherein the single sheet material is permeable and has a porosity of less than about 5%.

12. The device of claim 1 wherein the extending portion has a thickness of about 0.5 inches to about 0.75 inches.

13. The device of claim 1 wherein the blend enables one or more flowering plants to grow through the single sheet material.

* * * * *